(No Model.)

O. L. WHITNEY.
CAR FENDER.

No. 563,109. Patented June 30, 1896.

WITNESSES:
Edward Thorpe
Isaac R. Owens

INVENTOR
O. L. Whitney
BY
Munn & Co.
ATTORNEYS.

UNITED STATES PATENT OFFICE.

OSCAR L. WHITNEY, OF CAMBRIDGE, MASSACHUSETTS.

CAR-FENDER.

SPECIFICATION forming part of Letters Patent No. 563,109, dated June 30, 1896.

Application filed September 21, 1895. Serial No. 563,222. (No model.)

*To all whom it may concern:*

Be it known that I, OSCAR L. WHITNEY, of Cambridge, in the county of Middlesex and State of Massachusetts, have invented a new and Improved Car-Fender, of which the following is a full, clear, and exact description.

The object of this invention is to improve that class of fenders consisting of a horizontally-projected buffer adapted to receive the person or obstruction run down by the car, and to provide such fender with improved mechanism whereby persons and obstructions falling under the fender may be saved from contact with the wheels or other portions of the car. This end I attain by certain peculiar features of construction and combinations of parts, to be fully described hereinafter, and finally embodied in the claims.

Reference is to be had to the accompanying drawings, forming a part of this specification, in which similar characters of reference indicate corresponding parts in all the figures.

Figure 1:
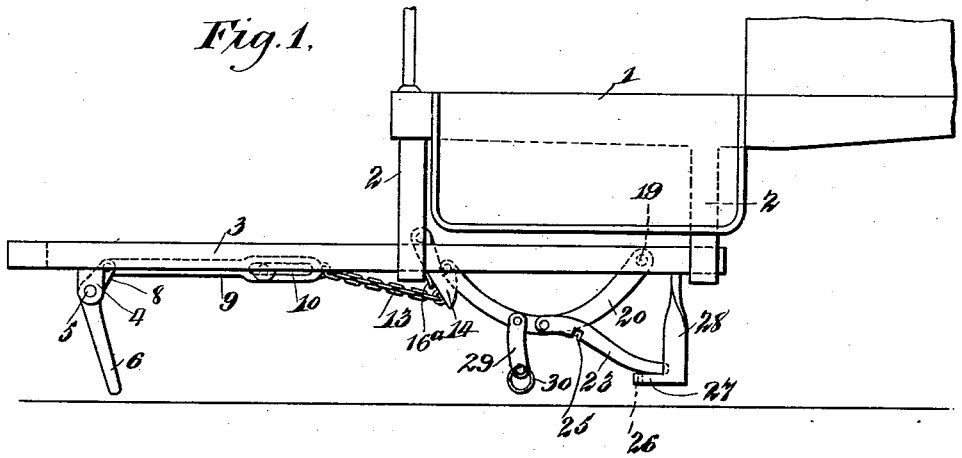
Figure 2:
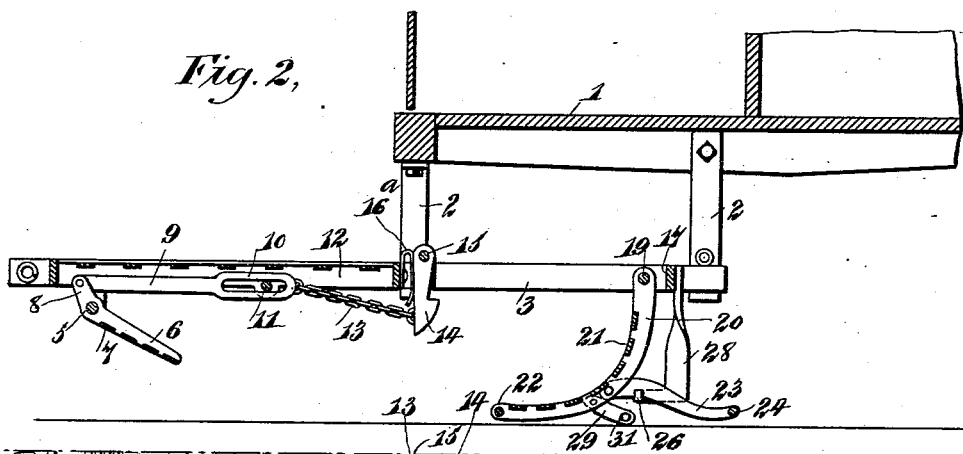

Figure 1 represents a side-elevation of the platform of a car, showing a fender applied thereto and provided with my improvement. Fig. 2 is a vertical longitudinal section of the same, and Fig. 3 is a fragmentary bottom plan view of the fender and the improvements applied.

In carrying out my invention, the platform 1 of the car has the usual brackets 2, in which the fender 3 is slidably mounted, as ordinarily. Depending from the front portion of the fender 3 are two lugs 4, which are transversely alined and have a shaft 5 rockably mounted therein. This shaft extends the entire width of the fender and has fixed thereto a series of arms 6, which, together with the transverse slats 7, extending from one arm to the other, form a frame normally located, as shown in Fig. 1, so as to occupy the space between the fender and the ground and to be engaged by any obstruction which passes beneath the outer portion of the fender.

Two of the arms 6 are formed with projections 8, having pivoted thereto longitudinally-extending links 9, each having an enlarged and slotted inner portion 10, receiving the transverse bar 11, carried by parallel and longitudinal plates 12, forming a part of the fender-body. The inner extremities of the links 9 have connected thereto chains 13 and these chains extend inward and are connected to the respective latch-hooks 14. These latch-hooks are fixed to a shaft 15, carried by the projections 16 of the slotted front portion of the fender, the said shaft being rockably mounted in the projections. The hooks 14 are given a tendency rearward by means of the U-shaped springs $16^a$, said springs being one for each hook.

Figure 3:
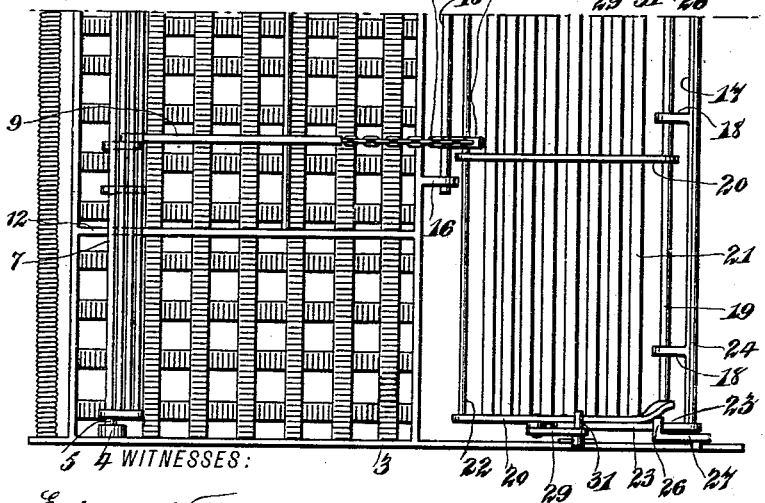

Projecting forwardly from the rear frame-bar 17 of the fender are a series of lugs 18, in which a shaft 19 is rockably mounted, and this shaft carries arms 20, which, together with the transverse slats 21, compose the catcher-platform of the fender, and this catcher-platform is substantially arc-shaped in form, and has at its front portion a transverse bar 22, adapted to lock with the hooks 14, so as to support the catcher-platform in the position shown in Figs. 1 and 3.

Pivotally connected to the outer middle portions of each of the end bars 20 is an arm 23, said arms having a double-curved form and having fixed to their rear ends the rod 24, which extends transversely from one arm to the other. Formed in the lower edge of each of the arms 23, and near their forward extremites, is a notch 25, said notches being respectively adapted to receive the projections 26, formed on the inner front extremities of the feet 27, forming a part of the depending brackets 28. These projections 26 also serve to hold the arms 23 raised and out of contact with the ground when the catcher-platform is raised, as shown in Fig. 1.

Pivoted to each end bar of the series 20 is a lifting-plate 29, having a ring 30 at its free end and having said free end extended to a point just forward of the notches 25 in the arms 23. The free ends of the plates 29 are provided with studs 31, which project inward and engage with the under sides of the arms 23 when the lifting-plates 29 move outwardly. The purpose of the lifting-plates 29 is to lift the catcher-platform out of engagement with the ground, and also to disengage the notches 25 of the arms 23 from the projections 26, and it will be seen that this dual operation is effected by merely swinging the free ends of the plates upwardly, causing them first to engage and lift the arms 23 and consequently to lift the catcher-platform into engagement with the latch-hooks 14.

In the operation of my invention, assuming the parts to be in the position shown in Fig. 1, which is their normal position, an obstruction being struck by the fender 3, the fender and catcher carried thereby will be moved bodily rearward, and should the obstruction then fall under the front portion of the fender, the frame composed of the bars 6 and slats 7 will be swung rearwardly, thus drawing the hooks 14 forward and depriving the catcher-platform of its support. Thereupon said platform will drop to the position shown in Fig. 2 just in time to catch the obstruction and save it from forcible contact with that part of the car which comes after the catcher-platform.

By pivoting the catcher on the fender, so that it will move bodily rearward with the fender when an obstruction is struck, the liability of the obstruction getting under the catcher is greatly decreased and the safety thus increased.

As the catcher-platform falls into the position shown in Fig. 2, the arms 23 will slide along the projections 26 until the notches 25 receive said projections, whereby the arms, and consequently the catcher-platform, will be locked in operative position. To raise and reset the apparatus the latch-plates 29 should be manually operated, as before described.

It will be understood that while my invention is here shown as applied to a specific form of fender, it is yet applicable to many other constructions.

Having thus described my invention, I claim as new and desire to secure by Letters Patent—

1. The combination of the longitudinally-slidable fender, the drop-catcher supported thereon so that the catcher will be moved bodily rearward in unison with the fender in case of a collision, a supporting device for holding the catcher in an elevated position, and mechanism for releasing the catcher, substantially as described.

2. The combination of a fender, a frame pivoted to the front thereof, a slotted link connected to the frame, a transverse guide-bar received in the slot of the link, a spring-pressed latch-hook, a chain connecting the hook and link, a catcher-platform pivoted rearward of the hook and normally supported thereby, an arm pivoted on the catcher-platform and having a notch therein, a supported projection on which the arm slides and with which the notch locks, and a latch-plate pivoted on the catcher-platform and engaging the arms, substantially as described.

3. The combination of the longitudinally-slidable fender, the catcher pivoted thereto, a supporting device carried by the fender and adapted to hold the catcher in an elevated position, and a releasing mechanism carried by the outer portion of the fender and operatively connected to said supporting device, substantially as described.

4. The combination with a fender, of a catcher pivoted to the rear portion of the fender, a hook pivoted to the fender in front of the catcher and adapted to engage the catcher to hold it elevated, a frame pivoted to the forward part of the fender, and a link connection between the pivoted frame and hook, substantially as described.

5. The combination of the pivoted catcher, the notched arms pivotally connected thereto, projections arranged to engage the notches of the arms and hold the catcher in a depressed position, and lifting-plates pivoted to the catcher and arranged to engage the notched arms to raise them out of contact with the said projections, substantially as described.

OSCAR L. WHITNEY.

Witnesses:
CHARLES F. HOPEWELL,
CHAS. H. MORSE.